United States Patent
Wasmuth et al.

(10) Patent No.: US 9,928,416 B2
(45) Date of Patent: Mar. 27, 2018

(54) METHOD FOR ASCERTAINING THE INVENTORY OF A CASH BOX USING THE ORIENTATION OF THE RECEIVING VALUE

(71) Applicant: WINCOR NIXDORF INTERNATIONAL GMBH, Paderborn (DE)

(72) Inventors: Ulrich Wasmuth, Willebadessen (DE); Michael Kremer, Geseke (DE)

(73) Assignee: Diebold Nixdorf, Incorporated, North Canton, OH (US)

( * ) Notice: Subject to any disclaimer, the term of this patent is extended or adjusted under 35 U.S.C. 154(b) by 259 days.

(21) Appl. No.: 14/890,781

(22) PCT Filed: May 15, 2014

(86) PCT No.: PCT/EP2014/059952
§ 371 (c)(1),
(2) Date: Mar. 2, 2016

(87) PCT Pub. No.: WO2014/184297
PCT Pub. Date: Nov. 20, 2014

(65) Prior Publication Data
US 2016/0188971 A1    Jun. 30, 2016

(30) Foreign Application Priority Data
May 15, 2013    (EP) .................................. 13167840

(51) Int. Cl.
*G06K 9/00* (2006.01)
*G07D 11/00* (2006.01)
(Continued)

(52) U.S. Cl.
CPC ....... *G06K 9/00442* (2013.01); *G06K 9/3208* (2013.01); *G06K 9/6217* (2013.01);
(Continued)

(58) Field of Classification Search
None
See application file for complete search history.

(56) References Cited

U.S. PATENT DOCUMENTS 5,478,992 A    12/1995   Hamada et al.
6,151,534 A *  11/2000   Smith .................. B07C 5/361
                                             209/534
(Continued)

FOREIGN PATENT DOCUMENTS

DE    102009035028    2/2011
DE    102010004580    7/2011
(Continued)

OTHER PUBLICATIONS

International Search Report dated Sep. 11, 2014.
International Preliminary Report on Patentability dated Nov. 17, 2015.

*Primary Examiner* — Matthew Bella
*Assistant Examiner* — Jose M Torres
(74) *Attorney, Agent, or Firm* — Black, McCuskey, Souers & Arbaugh, LPA (57) ABSTRACT

A method for determining the stock of notes of value in a device (12) for receiving notes of value includes determining the orientation of a note of value before it is fed to the device (12) and storing the order in which the notes of value are received in the device (12). For at least a part of the received notes of value their respective orientation is stored such that it is unambiguously assigned to the note of value. For determining the stock, the respective orientation of a predetermined number of successively removed notes of value is determined. These determined orientations are compared with the stored orientations and dependent on the result of the comparison the stock of notes of value in the device (12) is determined.

18 Claims, 7 Drawing Sheets

(51) Int. Cl.
*G06K 9/32* (2006.01)
*G06K 9/62* (2006.01)

(52) U.S. Cl.
CPC ....... *G07D 11/006* (2013.01); *G07D 11/0021* (2013.01); *G07D 11/0027* (2013.01); *G07D 11/0054* (2013.01); *G07D 11/0072* (2013.01); *G07D 11/0084* (2013.01)

(56) References Cited

U.S. PATENT DOCUMENTS

| | | | |
|---|---|---|---|
| 6,460,705 B1 * | 10/2002 | Hallowell | G07D 11/0003 |
| | | | 209/534 |
| 6,659,260 B2 * | 12/2003 | Otsuka | B65H 39/10 |
| | | | 194/302 |
| 7,899,233 B2 | 3/2011 | Kagehiro et al. | |
| 8,155,423 B2 | 4/2012 | Kagehiro et al. | |
| 2002/0067846 A1 * | 6/2002 | Foley | G06K 9/3208 |
| | | | 382/139 |
| 2005/0056519 A1 * | 3/2005 | Yokoi | G07D 11/0051 |
| | | | 194/206 |
| 2006/0043167 A1 * | 3/2006 | Fujioka | G07D 11/0066 |
| | | | 235/379 |
| 2008/0061127 A1 | 3/2008 | Brexel | |
| 2009/0229947 A1 | 9/2009 | Takai et al. | |
| 2012/0125734 A1 * | 5/2012 | Okamura | G07D 11/0054 |
| | | | 194/216 |

FOREIGN PATENT DOCUMENTS

| | | |
|---|---|---|
| EP | 0473106 | 3/1992 |
| EP | 1489562 | 12/2004 |
| EP | 2101301 | 9/2009 |
| WO | 2006063555 | 6/2006 |

\* cited by examiner

| Note 18 | 233 |
|---|---|
| Note 17 | 331 |
| Note 16 | 311 |
| Note 15 | 112 |
| Note 14 | 124 |
| Note 13 | 244 |
| Note 12 | 441 |
| Note 11 | 413 |
| Note 10 | 133 |
| Note 9 | 333 |
| Note 8 | 334 |
| Note 7 | 341 |
| Note 6 | 411 |
| Note 5 | 114 |
| Note 4 | 142 |
| Note 3 | 424 |
| Note 2 | - |
| Note 1 | - |

| Note 12 | Note 11 | Note 10 | Note 9 | Note 8 | Note 7 | Note 6 | Note 5 | Note 4 | Note 3 | Note 2 | Note 1 |
|---|---|---|---|---|---|---|---|---|---|---|---|
| 4 | 4 | 1 | 3 | 3 | 3 | 4 | 1 | 1 | 4 | 2 | 4 |

FIG. 6

| Note 9 | Note 8 | Note 7 | Note 6 | Note 5 | Note 4 | Note 3 | Note 2 | Note 1 |
|---|---|---|---|---|---|---|---|---|
| 3 | 3 | 3 | 4 | 1 | 1 | 4 | 2 | 4 |

FIG. 7

| Note 12 | Note 11 | Note 10 | Note 9 | Note 8 | Note 7 | Note 6 | Note 5 | Note 4 | Note 3 | Note 2 | Note 1 |
|---|---|---|---|---|---|---|---|---|---|---|---|
| 4 | 4 | 1 | 3 | 3 | 3 | 4 | 1 | 1 | 4 | 2 | 4 |

FIG. 11

METHOD FOR ASCERTAINING THE INVENTORY OF A CASH BOX USING THE ORIENTATION OF THE RECEIVING VALUE

BACKGROUND

1. Field of the Invention

The invention relates to a method for determining the stock of notes of value in a device for receiving notes of value, in which the orientation of a note of value is determined before feeding the note of value to the device and in which the order in which the notes of value are received in the device is stored.

2. Related Art

The method is in particular used for determining the stock of notes of value in a cash box. In cash boxes, the notes of value are received in the form of a value note stack such that they are standing on their edges in a receiving area of the cash box. When the cash box is received in an automated teller machine, an automatic cash register system and/or an automatic cash safe, notes of value can be fed and removed automatically to the cash box via an opening in the housing. In doing so, so-called multiple pull-offs may occur, i.e. two or more notes of value are pulled off inadvertently at the same time. As a result, among others the problem arises that it is no longer known how many notes of value are still received in the cash box. In the case of a mixed storage, it is then also no longer known which note of value is available next in the output order for removal. Thus, a reliable stock management which is in particular required for a closed cash cycle management is not possible.

After the occurrence of a multiple pull-off, it is common practice in the prior art to remove the cash box from the device in which it had been received and to remove all notes of value received in the cash box from the cash box and to count them so that a confirmed stock of the cash box is determined. This method has the disadvantage that it is very elaborate and time-consuming.

DE 10 2009 035 028 A1 discloses a method for determining the stock of the cash box after the occurrence of a multiple pull-off. In accordance with DE 10 2009 035 028 A1, the order of the individual banknotes and their serial number, each time unambiguously assigned to the individual banknotes, are stored in a memory element of the cash box. After the occurrence of a multiple pull-off a note of value is removed from the cash box and its serial number is determined. In this way, it can be determined how many notes of value were comprised by the multiple pull-off so that the stock of notes of value in the cash box is confirmed once again. What is problematic with this method is that, on the one hand, the detection of the serial number, in particular in the case of old, worn-out notes of value is only possible with difficulties due to contaminations and the like and, on the other hand, the long serial numbers require much memory space which is only available very limited in the memories of the cash box.

DE 10 2010 004 580 A1 discloses a further method for determining the stock of notes of value in a cash box after the occurrence of a multiple pull-off. Here, an extra sensor unit is provided by means of which the number of the banknotes of the multiple pull-off can be determined. Thus, also the number of the notes of value still received in the cash box can easily be calculated. This method has the disadvantage that for this purpose a separate sensor unit has to be provided, which involves additional costs and scarce space is taken up.

It is the object of the invention to specify a method for determining the stock of notes of value in a device for receiving notes of value, by means of which the stock of the device can be determined easily and reliably at any time.

SUMMARY OF THE INVENTION

According to the invention, the orientation of a note of value is determined before it is fed to the device. Further, at least for a part of the notes of value received in the device their respective orientation is stored such that it is unambiguously assigned to the respective note of value. For determining the stock of notes of value in the device, the respective orientation of a predetermined number of successively removed notes of value is determined. These determined orientations are compared with the stored orientations and, dependent on the result of this comparison, the stock of notes of value in the device is determined.

As a result, by means of a simple comparison of the orientations of the notes of value the current stock of notes of value in the device can be determined at any time only by the removal of the predetermined number of notes of value and the determination of their orientation. The orientation of notes of value can be determined in a particularly easy and reliable manner. Moreover, this can be accomplished with sensors which are provided anyway in all common devices in which cash boxes are received or in which the notes of value are directly handled.

The device for receiving notes of value is in particular a cash box. Here, it can be both a cash box in which the notes of value are received in a receiving area in the form of a value note stack such that they are standing on their edges and a cash box in which the notes of value are received on a drum storage such that they are wound between two foil belts. Further, the device for receiving notes of value can also be a storage for notes of value, such as a drum storage, permanently received in an automated teller machine, an automatic cash register system or an automatic cash safe.

For feeding and removing the notes of value, the device for receiving notes of value is in particular received in an automated teller machine, an automatic cash register system, an automatic cash safe or another device for handling notes of value. The determination of the orientation of the notes of value before feeding them to the device for receiving notes of value in particular takes place via a sensor unit of that one machine in which the device for receiving the notes of value is arranged. In particular, the determination of the orientation both before feeding and after removing is accomplished by means of an authenticity checking unit of the automated teller machine, the automatic cash register system or the automatic cash safe. This authenticity checking unit in particular serves to determine the authenticity of input notes of value and is thus provided in the device anyway so that no further sensors have to be provided for the method.

The determination of the orientation of the notes of value in particular takes place by means of an image capturing unit which captures at least one image of each note of value to be fed to the device for receiving notes of value or removed therefrom and determines its orientation by means of an image processing program.

The storage of the order in which the notes of value are received in the device and the storage of the respective orientation in particular takes place in a memory element of the device for receiving notes of value itself. Alternatively or additionally, the storage can also take place in a memory element of the automated teller machine, the automatic cash safe or the automatic cash register system in which the device for feeding and/or removing notes of value is received.

The execution of the program steps required for the method and/or the storage of the required data in the memory element in particular takes place via an external control unit arranged outside the device for receiving notes of value. Preferably, this is accomplished via a control unit of the automatic teller machine, the automatic cash register system or the automatic cash safe in which the device for receiving notes of value is received.

In a preferred embodiment, the orientation of each fed note of value is determined before it is fed to the device and stored such that it is unambiguously assigned to the corresponding note of value. Thus, the orientation of each received note of value is known. Alternatively, for example also the orientation of only every second note of value can be determined and stored. In this case, it is necessary for an unambiguous determination of the stock to remove a larger number of notes of value from the cash box and to determine their orientation.

The storage of the respective orientation in particular takes place in a data base in the memory element, wherein for each note of value there is one data set in which at least the orientation of the note of value is stored. In particular, for each note of value still further data, such as the denomination, are stored.

As an orientation of a note of value in particular its respective orientation relative to a sensor unit for detecting the orientation of the notes of value is determined. Here, it is preferably determined as orientation whether the respective note of value faces the sensor unit with its front side or reverse side and/or whether the respective note of value is upside down or not. Thus, there are in particular four possible orientations, namely "front side upside down", "front side not upside down", "reverse side upside down" and "reverse side not upside down".

For determining the orientation, the sensor unit in particular captures an image of the respective note of value and by means of an image processing program the orientation of the note of value in the captured image is determined. In particular, an image comparison with stored target images takes place. In this way, the orientation can be determined reliably in an easy manner.

In particular, a predetermined number of possible orientations is defined, wherein to each possible orientation one designation is assigned. In this case, as an orientation for example each time the corresponding designation is stored such that it is unambiguously assigned to the respective note of value. In particular, as a designation for each possible orientation a digit is used which is stored such that it is assigned to the respective note of value. In particular, the designations "1", "2", "3" and "4" are used, as a result whereof the orientations "front side upside down", "front side not upside down", "reverse side upside down" and "reverse side not upside down" can easily be assigned to the notes of value. By using such short designations the assignment can easily be accomplished with an extremely little storage requirement.

In one embodiment, the designations of the orientation are lined up one after the other in the order in which the notes of value are received so that there results a receiving pattern. This receiving pattern in particular represents a sequence of numbers, wherein each digit indicates the respective corresponding orientation of the corresponding note of value in the receiving order. Accordingly, the receiving pattern changes each time a note of value is removed or fed in that during the removal the corresponding digit of the removed note of value is deleted and during the feeding the corresponding digit of the fed note of value is added.

The designations of the orientations of the predetermined number of removed notes of value are preferably lined up one after the other to form a comparison pattern. The comparison pattern preferably corresponds to digits lined up one after the other. For determining the stock of notes of value in the device the receiving pattern and the comparison pattern are compared with one another. Thus, via a pattern comparison it can easily be determined how many notes of value are still received in the cash box.

It is particularly advantageous when the position of the comparison pattern within the receiving pattern is determined and when as a stock of notes of value in the device all notes of value are assumed which, in the receiving order of the notes of value, are arranged after the position in which the comparison pattern appears in the receiving pattern. When the position of the comparison pattern in the receiving pattern is known, then it is clear that all notes of value are still received in the device which are represented by all characters arranged in the receiving order after the comparison pattern.

In this connection, "arranged in the receiving order after a certain position" is understood to mean that a note of value that is arranged after another in the receiving order can only be removed when the note of value arranged ahead has been removed.

It is particularly advantageous that when the comparison of the comparison pattern and the receiving pattern results that the comparison pattern appears multiple times within the receiving pattern all notes of value are assumed as stock of notes of value in the device which, in the receiving order, are arranged after the position at which the comparison pattern appears the furthest ahead in the receiving order.

The receiving order indicates the order in which the notes of value can be removed from the device. If the comparison pattern appears multiple times in the receiving pattern then it is most likely that the removed notes of value from which the comparison pattern resulted are those notes of value which are arranged furthest ahead in the receiving order since it does not have to be assumed that a possible multiple pull-off or another error resulted in such a high deviation that such a high number of notes of value had been removed in an uncontrolled manner that the current stock of notes of value in the device is determined by the comparison pattern arranged further to the rear in the receiving order.

In one embodiment, the predetermined stock-determining number of successively removed notes of value, the orientation of which is used for determining the stock, is at least three notes of value. Preferably, the predetermined number is 10, 20 or 30 notes of value. The higher the number of notes of value used for forming the comparison pattern, the higher the number of different possible comparison patterns so that the probability that a comparison pattern appears multiple times in the receiving pattern is all the less. When using four different possible orientations and a comparison pattern of the length 3, 64 different comparison patterns are possible. When using a comparison pattern of the length 10, there result more than a million of different comparison patterns, given a length of 20 there result more than a trillion of possible comparison patterns and given a length of 30 there result even much more than a quintillion of different comparison patterns. Thus, at least when one assumes an arbitrary orientation of the notes of value in the device for receiving the notes of value, when using comparison patterns with a length of 20 or 30 notes of value, it can be assumed that it is almost impossible that a comparison pattern appears several times in the receiving pattern since in the case of standard cash boxes in which a maximum of 2200 notes of value can be received the receiving pattern comprises at most 2200 digits accordingly.

In one embodiment, the predetermined number for determining the stock of used notes of value is determined variably dependent on the respective current receiving pattern such that the position of the comparison pattern within the receiving pattern can be determined unambiguously. In this connection, unambiguously determining is in particular understood to mean that this test pattern is present only once in the receiving pattern. In this way, it is achieved that the number of notes of value to be removed for determining the stock is each time only so high as this is actually required for the unambiguous determination so that the expense can be reduced. In particular, a minimum number is preset which is at first removed and from which a first comparison pattern is formed. If the comparison of this comparison pattern with the receiving pattern results that the comparison pattern only appears once in the receiving pattern, then this comparison pattern is unambiguous so that the stock can be determined and no further notes of value have to be removed.

If, however, the comparison of the comparison pattern with the receiving pattern results that the comparison pattern appears at least twice in the receiving pattern, then a further note of value is removed and its orientation is determined so that a new comparison pattern results which contains at least one more digit than the preceding first comparison pattern. If the comparison of this second comparison pattern with the receiving pattern results that it appears only once in the receiving pattern, the stock of notes of value in the device is determined accordingly. If, however, the comparison results that this second comparison pattern also appears several times in the receiving pattern, a further note of value is removed, the orientation of which is determined and a new comparison pattern is formed. These method steps are continued until an unambiguous comparison pattern results and thus the stock can be determined reliably.

In another embodiment, when an error occurs during the removal of notes of value from the device so that the current stock is not known, then for determining the stock the predetermined number of notes of value is extra removed from the device and their orientation is determined. Thus, in the case of double or multiple pull-offs the stock can again be determined. The notes of value removed for determining the stock are in particular intermediately stored in an intermediate storage, wherein after determining the stock the intermediately stored notes of value are again transported back into the device so that these are available for withdrawal. Thus, the stock can be determined without the number of notes of value available for withdrawal being reduced.

In an alternative embodiment, the notes of value removed for determining the stock can also be transported to a receiving unit for receiving notes of value that are no longer used for withdrawal instead of the intermediate storage.

Additionally or alternatively, after each normal removal of a note of value from the device its orientation can be determined and dependent on the orientation of the predetermined number of last removed notes of value the occurrence of multiple pull-offs can be monitored. Normal removal of a note of value is in particular understood to mean the removal of a note of value by a user for cash withdrawal. Also for determining the multiple pull-offs during the normal operation in particular one of the afore-described pattern comparison methods is used.

As a result, it is achieved that it can immediately be determined at any time when an irregularity in the removal of notes of value, i.e. for example a multiple pull-off, has occurred. Thus, the withdrawal of incorrect amounts of money is prevented.

In a particularly preferred embodiment, before feeding a note of value to the device the orientation of the note of value is changed dependent on its orientation after determining the orientation of the note of value to be fed to the device. Further, this amended orientation, i.e. the orientation in which the note of value is actually received in the device, is stored as an orientation such that it is correspondingly assigned to the respective note of value.

The orientation is in particular changed such that there results an unambiguous receiving pattern. Thus, the receiving pattern is actively influenced so that a stock determination is possible reliably at any time. Users of automated teller machines, automatic cash register systems and/or automatic cash safes tend to input the notes of value input as a value note wad in the same orientation so that in practice a receiving pattern would result in which often long sections having the same orientation would appear. This would result in that when comparing the comparison pattern and the receiving pattern either comparison patterns having a very long length would have to be used or the assignment of the comparison pattern to the receiving pattern is not unambiguous but that an assignment is only possible via the plausibility check that it is most likely that the comparison pattern that is arranged furthest ahead in the receiving order is the correct one.

By changing the orientation, this problem is avoided so that a simple and reliable determination of the stock with a comparison pattern as short as possible is made possible.

In a particularly preferred embodiment, for determining the orientation of a note of value to be fed the receiving pattern resulting therefrom is determined prior to its feeding and it is checked whether this receiving pattern is unambiguous with respect to the used predetermined number of notes of value removed for the determination, i.e. with respect to the length of the comparison pattern. If this is the case, the orientation is not changed and the note of value is fed to the device in the originally fed orientation. If there results from the comparison that the receiving pattern resulting from the unchanged feeding of the note of value would not be unambiguous then the orientation is changed such that there results an unambiguous comparison pattern.

The orientation of the note of value is in particular changed such that each potentially possible comparison pattern only appears once within the receiving pattern.

For changing its orientation, the note of value is in particular turned over and/or rotated, wherein turning over is understood to mean the change between front side and reverse side and rotating is understood to mean the change between notes of value that are arranged upside down and not upside down. The turning over in particular takes place via a switch, preferably via a three-way switch. The rotation can, for example, take place via roller pairs arranged in an inclined manner to the direction of transport of the notes of value, by which the orientation of the notes of value can be changed.

Further features and advantages of the invention result from the following description which explains the invention in more detail on the basis of embodiments in connection with the enclosed Figures.

DETAILED DESCRIPTION

Figure 1:
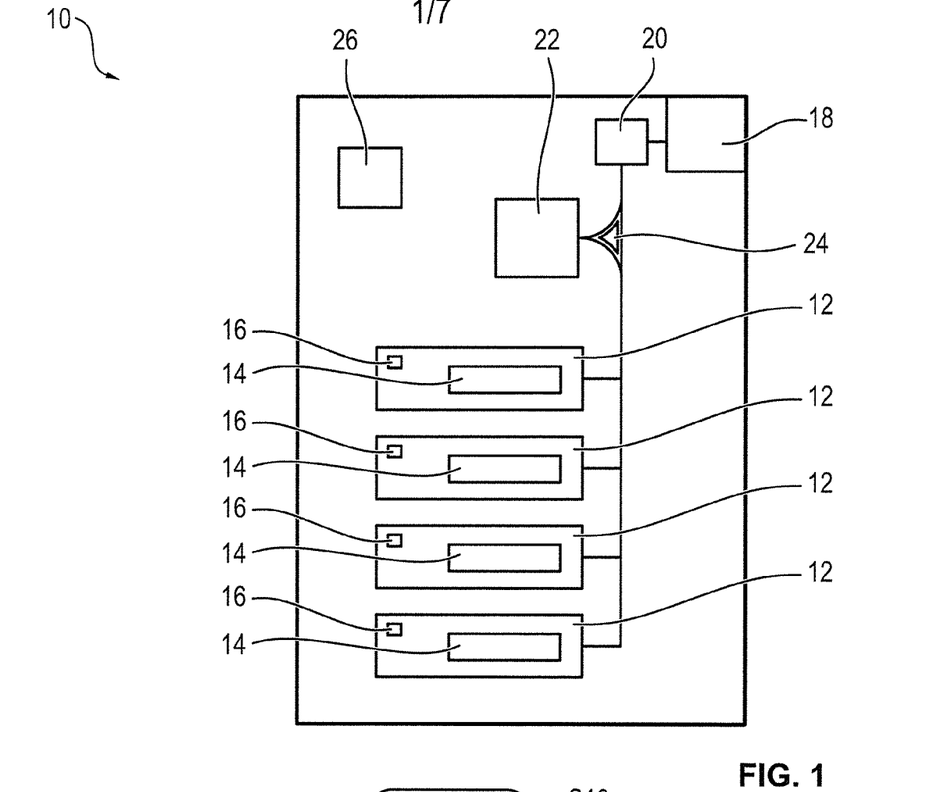
FIG. 1 shows a schematic illustration of an automated teller machine.

In FIG. 1, a schematic illustration of an automated teller machine 10 is illustrated. In the automated teller machine 10, four cash boxes are received, one of which is exemplarily identified with the reference sign 12. Each of the cash boxes comprises a receiving area 14 for receiving notes of value as well as a memory element 16 for storing information.

Further, the automated teller machine 10 has an input and/or output compartment 18 for the input and/or output of notes of value, wherein the input notes of value are checked via a value note checking device 20, wherein the authenticity of the notes of value is checked and/or their denomination is determined. Further, an intermediate storage 22 is provided in which the notes of value of a jointly input value note wad are stored until all individual notes of value have been checked for their authenticity and the input has been confirmed by a user. Further, the intermediate storage 22 can also serve to intermediately store notes of value during the withdrawal of notes of value and/or during internal transport operations of notes of value between the individual the cash boxes 12. For this, in particular a three-way-switch 24 is provided, by means of which the notes of value can be transported between the intermediate storage 22, the cash boxes 12 and the input and/or output compartment 18. Further, the automated teller machine 10 has a control unit 26 for controlling the individual bank elements.

When notes of value are removed from the cash boxes 12, so-called multiple pull-offs may occur, i.e. that two or more notes of value are pulled off inadvertently at the same time. This has the consequence that the stock of notes of value in the corresponding cash box 12 is no longer known since it cannot be determined by the light barriers usually provided along the transport paths of how many notes of value such a multiple pull-off is comprised. The knowledge about the current stock of notes of value in each cash box 12 is, however, indispensable for a reliable cash cycle management since otherwise it may happen that a cash box is completely emptied earlier than assumed by the cash cycle management. Particularly problematic is the occurrence of multiple pull-offs in the so-called mixed storage of notes of value, i.e. that notes of value of at least two denominations are received in one cash box 12. In the case of a multiple pull-off, it is thus no longer known which denomination of a note of value is received next in the receiving order in the cash box 12 so that the control unit 26 can no longer plan a withdrawal.

Figure 9:
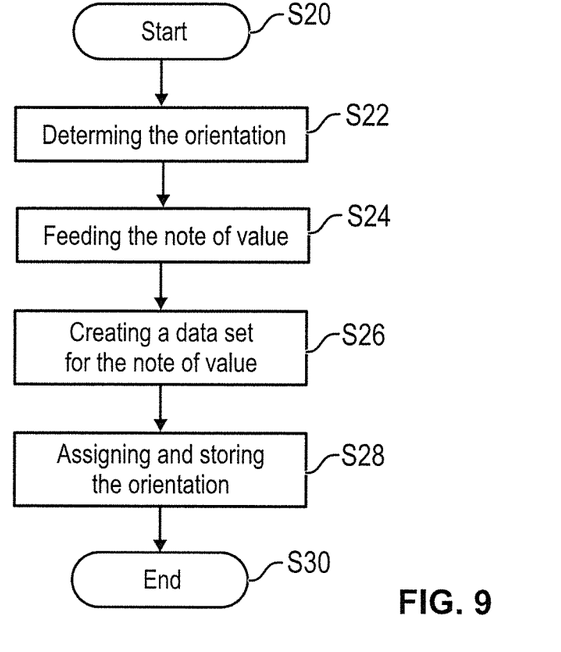
FIG. 9 shows a flow chart of a method for feeding notes of value according to a first embodiment.
Figure 10:
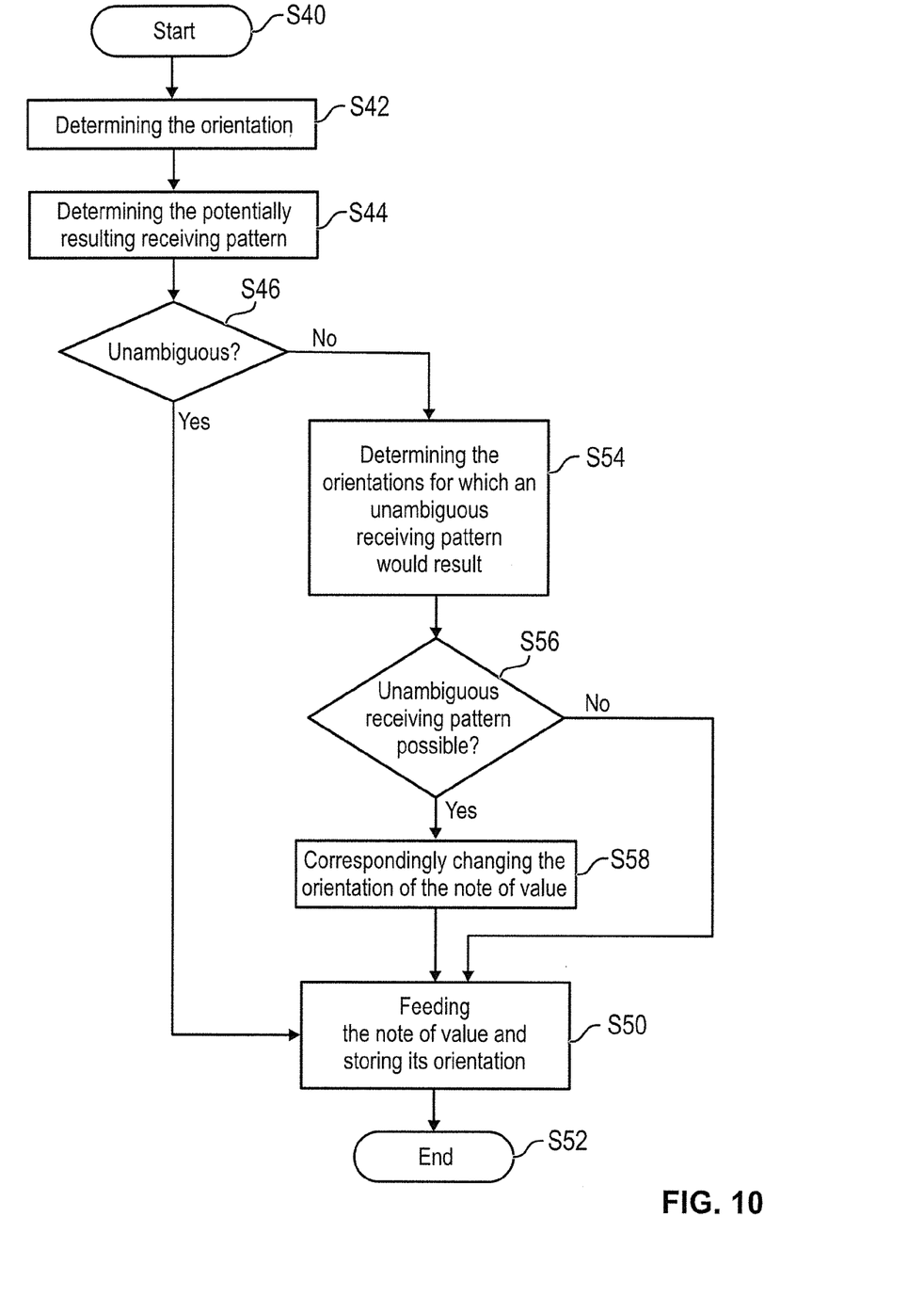
FIG. 10 shows a flow chart of a method for feeding notes of value according to a second embodiment.
Figure 11:
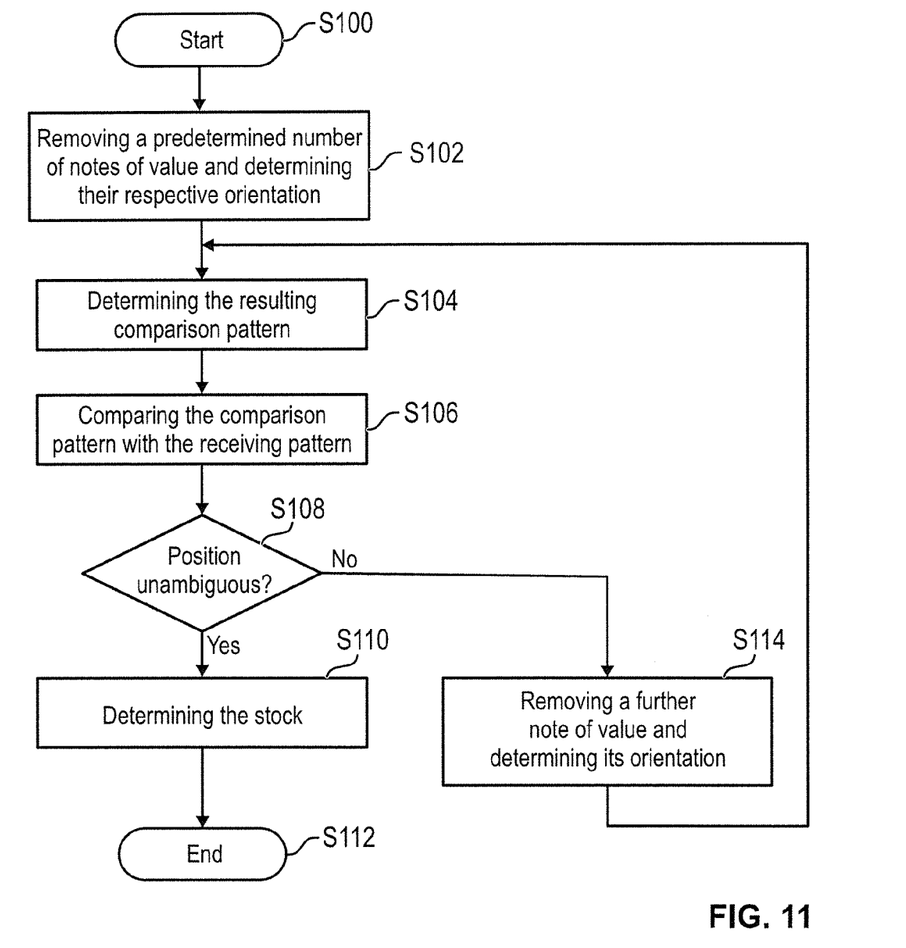
FIG. 11 shows a method for determining the stock of notes of value in a device for receiving notes of value according to a second embodiment.

In the following, a method is described in connection with FIG. 2, by means of which the stock of a cash box 12 can again be determined in an easy manner after the occurrence of a multiple pull-off or another error owing to which the stock is no longer known. In connection with FIGS. 3 to 8, preferred details of this method are shown. FIGS. 9 and 10 describe methods for feeding notes of value to the cash boxes 12, which can be integrated as method steps into the general method according to FIG. 2. FIG. 11 describes a preferred embodiment of a method for determining the stock of cash boxes.

All methods described in the following cannot only be used for cash boxes 12 but also for any other device for receiving notes of value, in particular for drum storages. In particular, the methods can also be provided for stationary devices for receiving notes of value, i.e. for devices that cannot be removed from an apparatus. In particular, these are drum storages integrated into an automated teller machine, an automatic cash register system or an automatic cash safe.

In the following, it is described in connection with the individual method steps with reference to FIG. 1 with which component parts the individual method steps can be performed. This is a merely exemplary description, which only serves for illustration purposes. Of course, the individual method steps can also be implemented via other equivalent component parts known to the skilled person.

Figure 2:
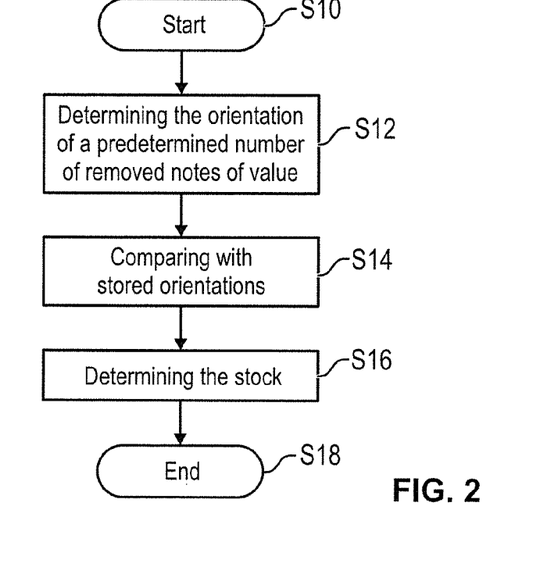
FIG. 2 shows a flow chart of a method for determining the stock of a device for receiving notes of value according to a first embodiment.

After the method for determining the stock according to FIG. 2 has been started in step S10, the determination of the orientation of a predetermined number of removed notes of value takes place in step S12. For this, the individual notes of value are preferably removed from the cash box 12 one after the other and their orientation is determined one after the other by means of the value note checking device 20. After determining the orientation of a note of value via the note checking device 20, the note of value is intermediately stored in the intermediate storage 22 until the orientation of the predetermined number of removed notes of value is determined. Afterwards, the notes of value are preferably again transported back from the intermediate storage 22 into the cash box 12 from which they were removed.

In the memory element 16 of each cash box 12, each time data with information on the notes of value stored therein are stored. In addition to the receiving order, each time also the orientation of each note of value received in the cash box 12 is stored in the memory element such that it is unambiguously assigned to this note of value. Alternatively, the orientation can also be stored in a memory element outside the cash box 12, such as in a memory element of the automated teller machine 10 or in a memory element of a central processing unit.

In step S14, the orientations of the removed notes of value are compared with the orientations stored in the memory element 16.

Based on the result of this comparison, the stock of notes of value in the cash box is determined in step S16. For this, it is in particular compared at which position in the receiving order of the individual notes of value in the cash box 12 the pattern of the orientations resulting from the removed notes of value appears. In this way, the current stock of notes of value in the cash box 12 can reliably be determined in an easy manner. After the stock has been determined, the method is terminated in step S18.

The afore-described method steps are in particular performed by the control unit 26 of the automated teller machine 10. Here, in particular corresponding program data are stored which are executed by the control unit 26.

Figure 3:
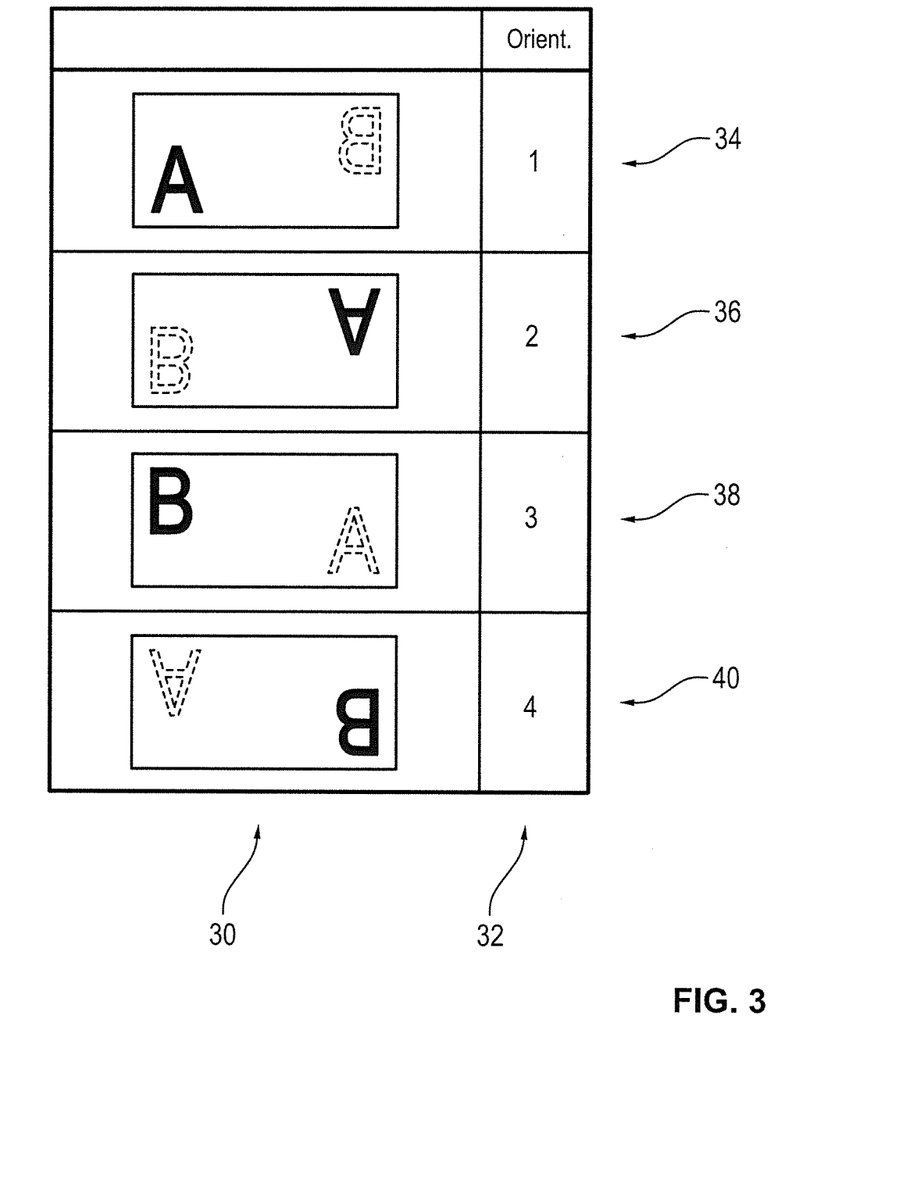
FIG. 3 shows an overview of different possible orientations of notes of value.

In FIG. 3, a table of possible orientations of the notes of value is illustrated. Here, in column 30 the various possible orientations are illustrated on the basis of the resulting image of a sample value note, wherein column 32 indicates a corresponding designation for the respective orientation. In the first orientation illustrated in line 34, the note of value has the orientation "front side not upside down", i.e. that the front side of the note of value faces an image capturing unit for capturing the image and the note of value is not upside down.

In the second orientation shown in line 36, the note of value has the orientation "front side upside down". Line 38 shows a third orientation in which the note of value has the orientation "reverse side not upside down". Line 40 shows a fourth orientation in which the note of value has the orientation "reverse side upside down".

When storing the respective orientations of the notes of value, as to how they are received in the cash box 12, the storage in particular takes place by means of the designation illustrated in column 32. Alternatively, also other designations can be used.

Figure 4:
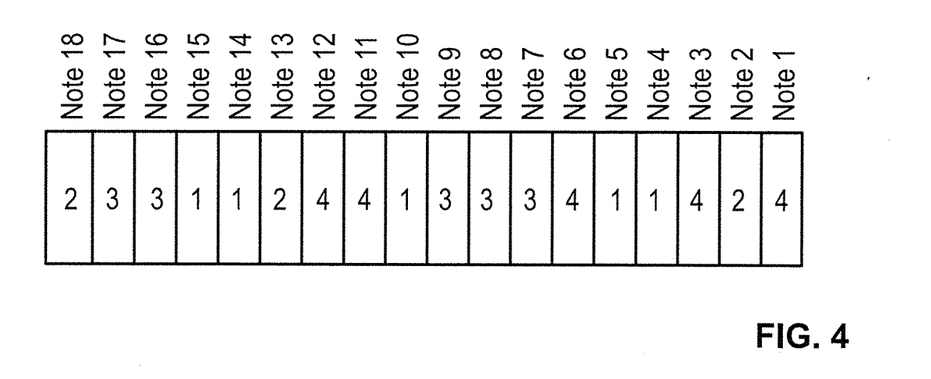
FIG. 4 shows a schematic illustration of a receiving pattern.

In FIG. 4, an example of a resulting receiving pattern of 18 notes of value is illustrated. Here, to each note of value 1 to 18 its respective orientation is assigned. For example, the note of value 1 has the orientation 4, i.e. the orientation "reverse side upside down". The note of value 2 has the orientation 2, i.e. the orientation "front side upside down".

Here, the individual notes of value are stored in the order in which they are received in the cash box, wherein at first the note of value 18 has to be removed before the note of value 17 can be removed etc. Thus, there results a receiving pattern comprised of 18 digits.

For determining the stock, now a predetermined number of notes of value is removed and their orientation is determined each time. Based on the orientation, a comparison pattern is formed which is compared with the receiving pattern.

Figure 5:
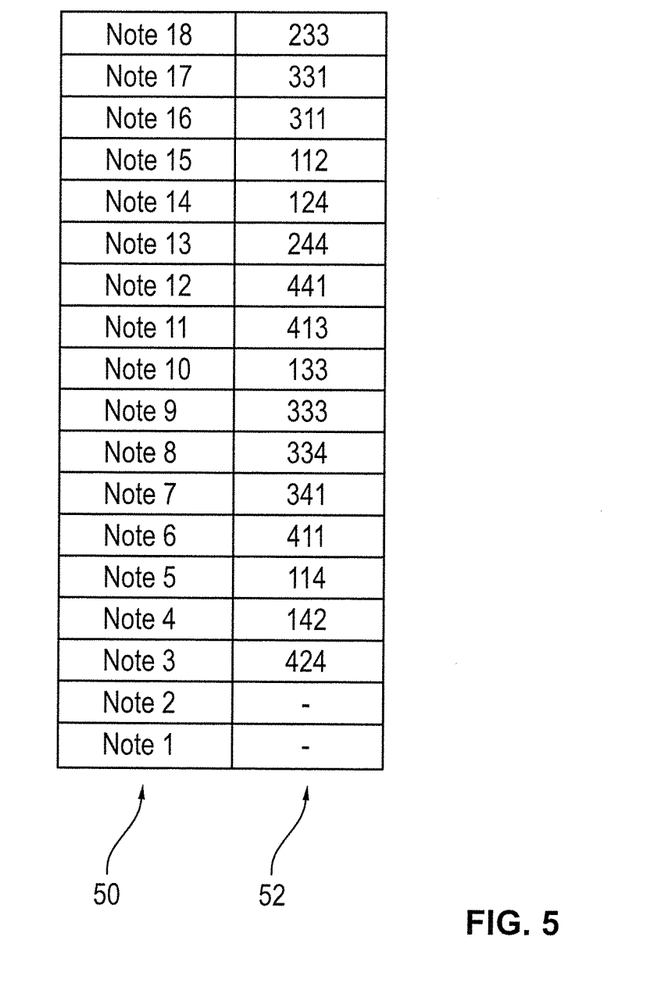
FIG. 5 shows a table of different comparison patterns resulting for the individual notes of value according to the example of FIG. 4 when using three successively removed notes of value for determining the comparison pattern for determining the stock.

In FIG. 5, a table is illustrated, wherein in column 50 the individual notes of value are listed and in column 52 the resulting comparison patterns are illustrated, when one removes three notes of value from the cash box 12 for determining the stock and determines their orientation. Thus, for the note 18, there results the comparison pattern 233, i.e. that when three notes of value are removed and this comparison pattern is determined, then it can easily be determined that still 18 notes of value are received and thus the note of value 18 has to be removed next.

For the note of value 17, on the other hand, there results the pattern 331 so that via the appearance of this pattern in the removal of notes of value it can be determined that still 17 notes of value are received.

When using four different orientations and a three-digit comparison pattern there result altogether 4³=64 different possible comparison patterns.

The higher the number of notes of value removed for determining the stock of the cash box 12, i.e. the more digits the comparison pattern comprises, the higher the number of possible different comparison patterns and the less likely it is that one comparison pattern is present multiple times within the receiving pattern. If, for example, a ten-digit comparison pattern is used, then there result 4¹⁰ different possible comparison patterns, i.e. more than a million of different comparison patterns. When using comparison patterns with twenty digits, there result 4²⁰, i.e. more than a trillion of different comparison patterns. The use of thirty-digit comparison patterns results in that that there are 4³⁰, i.e. more than a quintillion of different comparison patterns. When thirty-digit comparison patterns are used, in cash boxes in which usually a maximum of 2200 banknotes are received and under the assumption of a random orientation of the notes of value it can be assumed with almost absolute certainty that a comparison pattern does not repeat within the receiving pattern.

Should nevertheless a comparison pattern appear multiple times in the receiving pattern, then it is most likely that the stock corresponds to that stock that results from the comparison pattern arranged furthest ahead in the receiving order. In this case, therefore, this stock is assumed as the current stock.

The receiving pattern stored in the memory element 16 of the cash box 12 changes whenever a note of value is fed or removed. As long as no multiple pull-off occurs during the removal of notes of value, the respective stored receiving pattern corresponds to the respective current stock. If, however, a multiple pull-off occurs, which can, for example, be determined via a corresponding multiple pull-off sensor, then it is not known how many notes of value this multiple pull-off has comprised so that the stock has to be determined for a reliable stock management. If, for example, in the example from FIG. 4 there is a multiple pull-off after two notes of value, i.e. the notes of value 18 and 17 have been removed normally, then it is not known whether still 16 or less notes are received. Via other sensors of the automated teller machine 10 it can however often be determined how many notes had maximally been comprised by the multiple pull-off. In the following example, it is assumed that it is known that still between 16 and 10 notes of value have to be received in the cash box 12.

Figure 6:
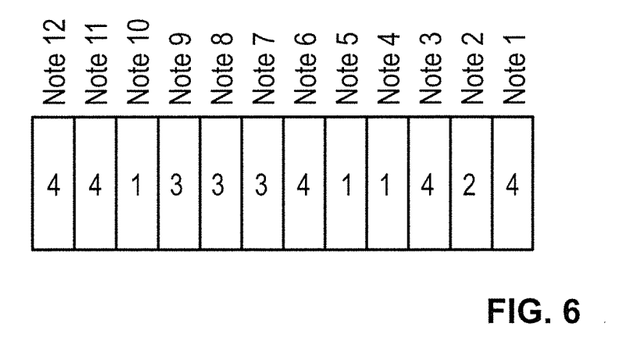
FIG. 6 shows a receiving pattern resulting after a multiple pull-off.

FIG. 6 shows the actual stock of the cash box after the multiple pull-off, which stock is, however, unknown to the control unit 26. Actually, the multiple pull-off comprised so many notes of value that still 12 notes of value are received.

For determining the stock, now three further notes of value are successively removed from the cash box and their orientation is determined each time. Thus, the notes of value 12, 11 and 10 are removed without it being known that the notes of value 12, 11 and 10 are concerned. By determining their orientation, there results the comparison pattern 441. Subsequently, this comparison pattern 441 is compared with the receiving pattern from FIG. 4. The comparison shows that this comparison pattern 441 appears for the first time for the notes of value 12, 11 and 10. Thus it is known that after the occurrence of the multiple pull-off still the notes of value 1 to 12 were received in the cash box 12.

Figure 7:
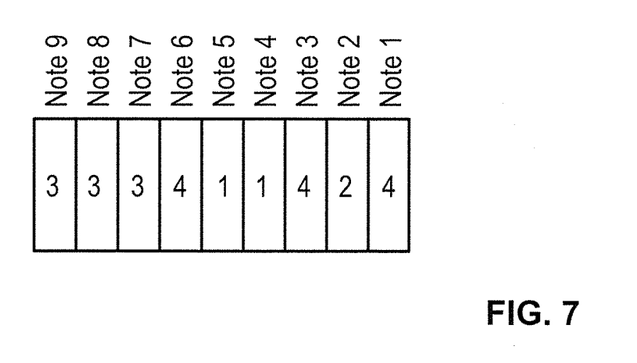
FIG. 7 shows a resulting receiving pattern after the removal of three further notes of value.

FIG. 7 shows the current stock of notes of value in the cash box 12 after the removal of the three notes of value of the comparison pattern. In this case, the actual stock corresponds to the state of knowledge on the stock so that the stock illustrated in FIG. 7 represents a confirmed value note stock.

Figure 8:
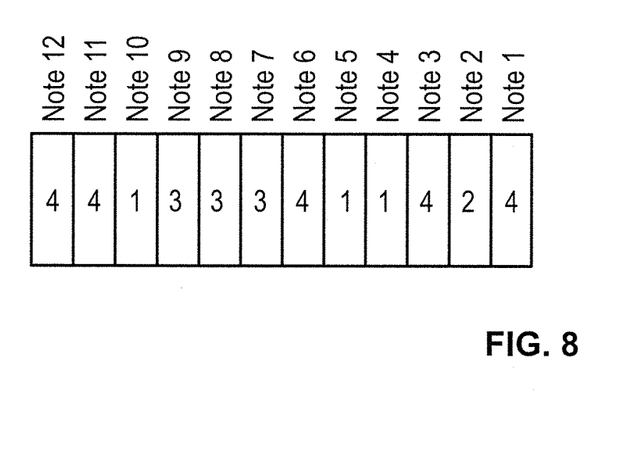
FIG. 8 shows a resulting receiving pattern after determining the stock.

Subsequently, the notes of value 12, 11 and 10 removed for determining the comparison pattern are again transported back from the intermediate storage 22 into the cash box 12 so that the confirmed value note stock as illustrated in FIG. 8 results. This one corresponds to the unconfirmed stock from FIG. 6, wherein, however, in the situation illustrated in FIG. 6, this stock was not known to the control unit 26 and could only be determined via the removal of the three notes of value and the determination of their orientation.

Thus, via the comparison of the receiving pattern with the determined comparison pattern the current stock can be determined in an easy manner after the occurrence of a multiple pull-off or another error without a physical intervention of a user being necessary, in particular without an emptying of the cash box 12 being necessary. For determining the respective orientation of the notes of value in particular each time at least one image with a representation of the note of value is captured by the value note checking unit 20, wherein the images shown in column 30 of FIG. 3 may result. By means of an image comparison with preset target images for the respective orientations it can easily be determined which orientation is present.

In FIG. 9, a flow chart of a method for receiving notes of value in a device for handling notes of value is illustrated. After the method has been started in step S20, the orientation of an input note of value is determined in step S22, in particular by means of the value note checking device 20. Subsequently, in step S24 the note of value is fed to the cash box 12 in which it is to be received and in step S26 a data set is created in the memory element 16 for the corresponding note of value. This data set contains at least information on the fact at which position in the receiving order this note of value is arranged. In addition, further information, such as the denomination of the note of value, can be stored.

In step S28, the orientation of the fed note of value is stored such that it is unambiguously assigned to the note of value. Subsequently, the method is terminated in step S30.

When feeding several notes of value in the form of a value note wad, the afore-described method steps are in particular performed successively multiple times, wherein however in particular at first the determination of the authenticity of all fed notes of value takes place and the notes of value are intermediately stored in the intermediate storage 22 until from all notes of value of the value note wad the authenticity has been checked and the orientation has been determined. Only then, the feeding of the individual notes of value one after the other and the creation of the individual data sets with the respective orientations take place in step S24.

In FIG. 10, a flow chart of a further method for feeding notes of value to cash boxes 12 is described. As in the method according to FIG. 9, the method according to FIG. 10 results in that for the received notes of value their respective orientation is known and there results a receiving pattern which can be used for determining the stock via the comparison with a comparison pattern. In the method according to FIG. 10, influence is exerted however on the receiving pattern, as will be explained in more detail in the following, so that there results an unambiguous receiving pattern.

After the method has been started in step S40, in step S42 the orientation of a note of value fed to the automated teller machine 10 is determined. Subsequently, in step S44 a potentially resulting receiving pattern is determined which would result if the note of value were to be fed to the cash box 12 in an unchanged manner with the determined orientation.

Subsequently, in step S46 it is checked whether the potentially resulting receiving pattern is unambiguous, i.e. it is checked whether in the preset length of the comparison patterns at least one comparison pattern appears several times in the receiving pattern. If it results from the comparison in step S46 that the potential receiving pattern is unambiguous, i.e. that in the receiving pattern no possible comparison pattern appears several times, then the method is continued in step S50 in that the note of value is fed to the cash box 12 and its orientation is stored such that it is unambiguously assigned to the note of value. Subsequently, the method is terminated in step S52.

If, on the other hand, it results in step S46 that the receiving pattern is not unambiguous then it is determined in step S54 for which orientations of the fed note of value an unambiguous receiving pattern would result. Subsequently, it is evaluated in step S56, if an unambiguous receiving pattern is possible. Thus, it is in particular determined whether in step S54 an orientation could be determined at all for which an unambiguous receiving pattern would result and, on the other hand, whether the note of value can be rotated or turned over such that there results an orientation required for an unambiguous receiving pattern.

If it results from the evaluation in step S56 that no unambiguous comparison pattern can be formed by a change of the orientation of the note of value, the method is continued in step S50 with the feeding of this note of value without changing its orientation.

If, on the other hand, it is determined in step S56, that an unambiguous receiving pattern is possible the method is continued in step S58 in that the orientation of the note of value is changed accordingly before the note of value is then fed in step S50 in the corresponding new orientation and also the corresponding new orientation is stored such that it is unambiguously assigned to the note of value.

This method has the advantage that, if possible, an unambiguous receiving pattern is formed so that for all resulting constellations the stock can be determined reliably without doubt and without any probability assumptions on the position of the determined comparison pattern.

The change of the orientation of notes of value is in particular accomplished via the three-way switch 24. If the transport of the notes of value takes place "long side first", i.e. that the notes of value are transported within the automated teller machine 10 with one of their long edges first, the orientation 4 can be changed to the orientation 1 via the switch 24 and vice versa. Further, the orientations 2 and 3 can be changed for one another. If, on the other hand, a transport "short side first", i.e. with one of the short sides first, were to take place, then a change of the orientation between orientation 1 and 3 as well as the orientations 2 and 4 could be accomplished.

In addition to the turn-over via the switch 24, one or more roller pairs could be provided in a transport section within the automated teller machine 10, which are arranged in an inclined manner to the transport direction so that by means of the roller pairs forces which are inclined to the direction of transport can be exerted on a note of value so that this one can be rotated. Thus, in this embodiment each orientation can be changed into any other.

In FIG. 11, a flow chart of a method for determining the stock of notes of value in a cash box 12 is illustrated according to a second embodiment. After the method has been started in step S100, in step S102 a predetermined number of notes of value in the cash box 12, the stock of which is to be determined, is removed and their orientation is determined. Here, the removal and the determination of the orientation can in particular take place again individually successively.

Subsequently, in step S104, the resulting comparison pattern is determined which is then compared with the receiving pattern in step S106. In step S108, it is then determined whether the comparison pattern only appears once in the receiving pattern, and thus the position of the comparison pattern in the receiving pattern is unambiguous or not. If the comparison results that the position is unambiguous, then in step S110 that stock which is represented by this corresponding position is assumed as actual stock of the cash box 12 before the method is terminated in step S112.

If, on the other hand, it has been determined in step S108 that the comparison pattern appears at least twice in the receiving pattern, and thus the position is not unambiguous, then a further note of value is removed from the cash box 12 in step S114 and its orientation is determined. Subsequently, the method is continued in step S104, i.e. that next a comparison pattern is again determined which now comprises one more digit. Subsequently, in step S104 again the resulting comparison pattern is determined which is compared with the receiving pattern in step S106. In step S108, it is determined whether this new comparison pattern is unambiguous now. If the position of the new comparison pattern is still not unambiguous, the method is continued in step S114 and a further note of value is removed. These steps are repeated until there results an unambiguous comparison pattern. Alternatively, the steps may also be repeated until a preset maximum number of notes of value has been removed and thus a comparison pattern of this maximum length has resulted. Thus, it can be avoided that there result very long comparison patterns.

The above-described methods cannot only be used for determining the stock after the occurrence of a multiple pull-off but also for determining the stock during normal operation, as a result whereof then in turn a multiple pull-off can be detected. For this, in particular after the removal of each note of value together with the already previously removed notes of value a comparison pattern is determined each time on the basis of their orientation and is compared with the receiving pattern. Thus, after each removed note of value the stock can be determined. The stock determined in this way can be compared with the target stock that would result when no multiple pull-off has occurred, i.e. an orderly removal has taken place. Thus, the occurrence of a multiple pull-off can easily be detected.

LIST OF REFERENCE SIGNS 10 automated teller machine
12 cash box
14 receiving area
16 memory element
18 input and/or output compartment
20 value note checking device
22 intermediate storage
24 switch
26 control unit
30, 32 column
34, 36, 38, 40 line
50, 52 column
S20 to S114 method steps

What is claimed is:

1. A method for determining the stock of notes of value in a device for receiving notes of value, comprising:
    defining a predetermined number of possible orientations for notes of value,
    assigning a designation to each possible orientation,
    determining orientations of received notes of value before the received notes of value are fed to the device,
    assigning to each of the received notes of value the designation corresponding to the orientation,
    storing the order in which the received notes of value are received in the device,
    storing the designations for at least a part of the received notes of value such that the designations are unambiguously assigned to the corresponding received notes of value,
    lining up the designations of the received notes of value one after the other in the order in which they are received so that there results a receiving pattern,
    removing a predetermined number of received notes of value from the device, determining their orientation, and assigning a designation to each of the predetermined number of notes of value,
    lining up the designations of the removed predetermined number of received notes of value to form a comparison pattern, and
    comparing the receiving pattern and the comparison pattern for determining the stock of notes of value in the device.

2. The method of claim 1, wherein the orientation of each received note of value is determined and is stored such that it is unambiguously assigned to the received note of value.

3. The method of claim 2, further comprising determining the orientation of a note of value by detecting the orientation of the note of value relative to a sensor unit.

4. The method of claim 3, wherein detecting the orientation of a note of value comprises determining whether the note of value faces the sensor unit with its front or reverse side and/or whether the note of value is upside down or not.

5. The method of claim 1, further comprising determining the position of the comparison pattern within the receiving pattern, and wherein a stock of notes of value in the device is all notes of value which, in the receiving order of the notes of value, are arranged ahead of the position at which the comparison pattern is arranged in the receiving pattern.

6. The method of claim 1, wherein the predetermined number of successively removed notes of value, the orientation of which is used for determining the stock, is at least 3.

7. The method of claim 1, wherein the predetermined number of successively removed notes of value is determined variably dependent on the respective current receiving pattern such that a position of the comparison pattern within the receiving pattern can be determined unambiguously.

8. The method of claim 1, wherein when an error occurs during the removal of notes of value from the device so that the current stock is not known, the predetermined number of notes of value are again removed from the device and their orientation is determined for determining the stock.

9. The method of claim 8, wherein the removed notes of value are intermediately stored in an intermediate storage and after determining the stock are again transported back into the device.

10. The method of claim 1, further comprising determining the orientation after each normal removal of a note of value, and, dependent on the orientation of the predetermined number of last removed notes of value, monitoring the occurrence of multiple pull-offs.

11. The method of claim 1, wherein after determining the orientation of a note of value to be fed to the device, the method further comprising changing the orientation dependent on its orientation before feeding, and storing this changed orientation such that this changed orientation is unambiguously assigned to the note of value.

12. The method of claim 11, wherein the orientation is changed such that the resulting receiving pattern is unambiguous.

13. The method of claim 12, wherein the note of value is turned over and/or rotated for changing its orientation.

14. The method of claim 11, wherein the note of value is turned over and/or rotated for changing its orientation.

15. A method for determining the stock of notes of value in a device for receiving notes of value, comprising:
- defining a predetermined number of possible orientations for notes of value,
- assigning a designation to each possible orientation,
- determining the orientation of a received note of value before the received note of value is fed to the device,
- assigning to the received note of value the designation corresponding to its orientation,
- storing the order in which the received note of value is received in the device,
- storing the designation of the received note of value such that the designation is unambiguously assigned to the corresponding received note of value,
- lining up the designation of the received note of value with previously received notes of value one after the other in the order in which they are received so that there results a receiving pattern,
- removing a predetermined number of received notes of value from the device, determining their orientation, and assigning a designation to each of the predetermined number of removed notes of value,
- lining up the designations of the removed predetermined number of received notes of value to form a comparison pattern, and
- comparing the receiving pattern and the comparison pattern for determining the stock of notes of value in the device.

16. The method of claim 15, further comprising determining the position of the comparison pattern within the receiving pattern, and wherein a stock of notes of value in the device is all notes of value which, in the receiving order of the notes of value, are arranged ahead of the position at which the comparison pattern is arranged in the receiving pattern.

17. The method of claim 15, wherein the predetermined number of successively removed notes of value, the orientation of which is used for determining the stock, is at least 3.

18. The method of claim 15, further comprising determining the orientation after each normal removal of a note of value, and, dependent on the orientation of the predetermined number of last removed notes of value, monitoring the occurrence of multiple pull-offs.

* * * * *